United States Patent [19]
Goker

[11] Patent Number: 5,986,846
[45] Date of Patent: Nov. 16, 1999

[54] METHODS AND APPARATUS FOR TRACK CENTERING AN ARCUATE SCANNER HEAD ASSEMBLY

[75] Inventor: Turguy Goker, Solana Beach, Calif.

[73] Assignee: Seagate Technology, Inc., Scotts Valley, Calif.

[21] Appl. No.: 08/890,711

[22] Filed: Jul. 9, 1997

[51] Int. Cl.$^6$ .................................................. G11B 5/584
[52] U.S. Cl. ............................ 360/77.13; 360/75; 360/81
[58] Field of Search .............................. 360/77.13, 77.12, 360/75, 70, 64, 84, 85, 53, 76, 72.1, 81, 73.03, 73.04, 77.01, 83, 77.15, 73.09, 73.12, 48

[56] References Cited

U.S. PATENT DOCUMENTS

| 5,796,537 | 8/1998 | Goker et al. ......................... 360/75 X |
| 5,815,337 | 9/1998 | Milo ........................................ 360/75 |
| 5,847,892 | 12/1998 | Goker . | |

*Primary Examiner*—Muhammad Edun
*Attorney, Agent, or Firm*—McDermott, Will & Emery

[57] ABSTRACT

A servoing system is provided for use in an arcuate scanner having an arcuate scanner head assembly (ASHA) that has least one transducer on a rotatable drum. The servoing system includes a first detection circuit, a second detection circuit, logic, and a positioning apparatus. The first detection circuit is coupled to the transducer and detects alignment identifiers that are recorded on the tape and sensed by the transducer. The second detection circuit is also coupled to the transducer and detects an envelope of the scanned signal during the scan. The logic compares the alignment identifiers to determine if the ASHA is properly aligned with the tracks on the tape, and in response outputs a fine error signal. The logic also compares the envelope as detected during the scan with a threshold value and outputs a coarse error signal in response. Based on the arrangement of the logic, the fine error signal identifies that either a minor misalignment of the transducer to the tape exists or a proper alignment exists. The coarse error signal identifies that a significant misalignment of the transducer to the tape exists. The positioning apparatus, in response to either the fine error signal or coarse error signal, changes the position of the arcuate scanner head assembly with respect to the tape as a function of the received error signal.

21 Claims, 7 Drawing Sheets

METHODS AND APPARATUS FOR TRACK CENTERING AN ARCUATE SCANNER HEAD ASSEMBLY

FIELD OF THE INVENTION

The present invention relates to tape drives having an arcuate scanner, and more particularly to methods and apparatus for controlling the alignment of an arcuate scanner head assembly (ASHA) to more accurately control the operation of reading data from the tape.

BACKGROUND OF THE INVENTION

A number of magnetic tape drive systems have been developed to provide mass data storage, for example for personal computer systems. One emerging technology providing high density storage, preferably on quarter inch magnetic tape, utilizes arcuate scanning. With this type of scanning, read and write scanner heads are mounted near the periphery of a circular planar surface and rotated thereon about an axis passing through the center of the circular surface and through the plane of a longitudinally-moving tape. In writing data on a tape, arcuate scanners produce a sequence of arcuately-shaped tracks which are transverse to the longitudinal axis of the tape.

Examples of arcuate scanning tape drives are described, for example, in: U.S. Pat. No. 2,750,449; U.S. Pat. No. 2,924,668; U.S. Pat. No. 3,320,371; U.S. Pat. No. 4,636,886; U.S. Pat. No. 4,647,993; and U.S. Pat. No. 4,731,681.

International Application WO 93/26005 to Lemke et al. discloses an example of an arcuate scanning tape drive for computer data storage. In the Lemke et al. arcuate scanning tape drive, a number of scanner heads are provided around the periphery of the circular planar surface. As the scanner rotates and the tape moves past the rotating scanner surface, the read and write heads alternately pass over the tape. The operation of the scanner is commutated or switched from "write" to "read" to alternately activate the appropriate operation through alternate ones of the scanner heads.

To effectively read and write data in arcuate tracks on a longitudinally moving tape requires (1) writing the tracks in an agreed format, position and alignment on the tape, and (2) corresponding positioning and alignment of the read heads during the read operation to locate and recover the data written on the tracks. In an arcuate scanner of the type described by Lemke et al., there are a number of variables which affect both the read operation and the write operation. These include tape speed, rotational speed of the scanner head and orientation or positioning of the scanner head with respect to the tape. Several of these variables are affected by external factors. For example, if there is some vibration of a scanner during the writing operation, it may be difficult to align the head with the data tracks during a subsequent read operation, particularly if the read operation is performed by a different scanner.

The above cited Lemke et al. document discloses a technique for controlling several of these variables during the read and write operations. In the Lemke et al. arcuate scanner, for example, the positioning of the ASHA is controlled via a servoing mechanism that senses specific servo burst information from one or more previously written tracks. For example, low frequency servo burst information is detected at either the beginning and/or at the end of a scan over the track via a transducer (e.g., a read head). Based on a corresponding low frequency servo burst signal(s), the location/alignment of the ASHA with respect to the tape/tracks is then determined. If the ASHA is not properly aligned, then adjustments are made to correct the positioning of the ASHA.

In arcuate scanning it is necessary to stay on track for recording, and on replay, it is necessary to match the pointing of the reading scanner with the pointing of the scanner that wrote the information on the tape. Both the read and write operations are therefore substantially affected by the angular position of the ASHA with respect to the tape. Misalignment often prevents accurate recovery of stored data. By relying on the low frequency servo information recorded within the tracks, the above-cited technique provides for fine-tuning and/or final alignment of the ASHA with respect to the tape. However, if the initial or a later misalignment of the ASHA with respect to the tape is significant enough, then the above-cited technique may not adequately recognize and/or correct the misalignment.

SUMMARY OF THE INVENTION

The present invention overcomes many of the above-noted problems regarding alignment of the ASHA by providing methods and apparatus for recognizing instances when the ASHA is significantly misaligned with the tracks on the recording tape. When significant misalignment exists, in accordance with the present invention a coarse alignment adjustment is made to the position of the ASHA after which additional fine alignment adjustments are then made to complete and maintain proper alignment.

In accordance with one aspect of the present invention, the scanned signal from a transducer on the ASHA is evaluated to determine if the path of the transducer, during the scan of the tape, crossed over more than one track. The envelope of the rapidly changing scanned signal can be readily detected, for example by way of an envelope detector circuit, and evaluated to determine if the transducer crossed from one track to another during the scan. For example, the voltage of a detected and conditioned (e.g., filtered) envelope signal tends to drop in magnitude when the transducer passes from one track to the next during a scan. Such a fluctuation, if identified, reveals that the ASHA is significantly misaligned. Thus, if these fluctuations are identified during an initial scan, then corrective steps can be taken to properly align the ASHA with the subsequent tracks recorded on the tape by repositioning the AHSA to eliminate these fluctuations.

Thus, in accordance with one embodiment of the present invention there is provided a method for correcting the alignment of an arcuate scanner head assembly to the tracks on a tape. The method includes sensing changes in magnetic flux recorded on a surface of the tape through a transducer located on a rotating drum of the arcuate scanner head assembly, outputting a corresponding signal, detecting an envelope of the signal, and causing a position of the arcuate scanner head assembly to change if the envelope breaches or otherwise crosses a threshold value.

The earlier stated needs are also met by embodiments of the present invention which provide an apparatus for use in a servoing system for aligning a transducer on an arcuate scanner head assembly to the data tracks recorded on a tape. The apparatus includes an envelope detector and a coarse adjustment circuit. The envelope detector is coupled to the transducer and configured to detect an envelope of a scanned signal received from the transducer during an arcuate scan of the tape. The coarse adjustment circuit is coupled to the envelope detector and configured to output an error signal that identifies a misalignment of the transducer to the tape when the envelope breaches or crosses a threshold value during the arcuate scan. In certain embodiments of the present invention, the coarse adjustment circuit includes logic. The logic is configured to count the number of times that the envelope breaches the threshold value and generate the error signal when the count is greater than zero for a given scan.

A servoing system is provided in certain embodiments. The servoing system is for use in an arcuate scanner having an arcuate scanner head assembly that has least one transducer on a rotatable drum. The servoing system includes a first detection circuit, a second detection circuit, a logic, and positioning means. The first detection circuit is coupled to the transducer and configured to detect first and second alignment identifiers within the scanned signal, wherein the alignment identifiers are recorded on the tape and sensed by the transducer. The second detection circuit is also coupled to the transducer, but is instead configured to detect an envelope of the scanned signal during the scan. The logic, which is coupled to both the first and second detection circuits, is configured to compare the first and second alignment identifiers and in response output a fine error signal. The logic further compares the envelope as detected during the scan to a threshold value and outputs a coarse error signal in response. Thus, based on the arrangement of the logic, the fine error signal identifies that a minor misalignment of the transducer to the tape exists as determined by considering the first and second alignment identifiers. The coarse error signal identifies that a significant misalignment of the transducer to the tape exists as determined by the envelope breaching the threshold value. The positioning means is coupled to the logic and the arcuate scanner head assembly. The positioning means is responsive to either the fine error signal or the coarse error signal, and is configured to change the position of the arcuate scanner head assembly with respect to the tape based on the received error signal.

The foregoing and other features, aspects and advantages of the present invention will become more apparent from the following detailed description of the present invention when taken in conjunction with the accompanying drawings.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF AN ILLUSTRATIVE EMBODIMENT

Figure 1:
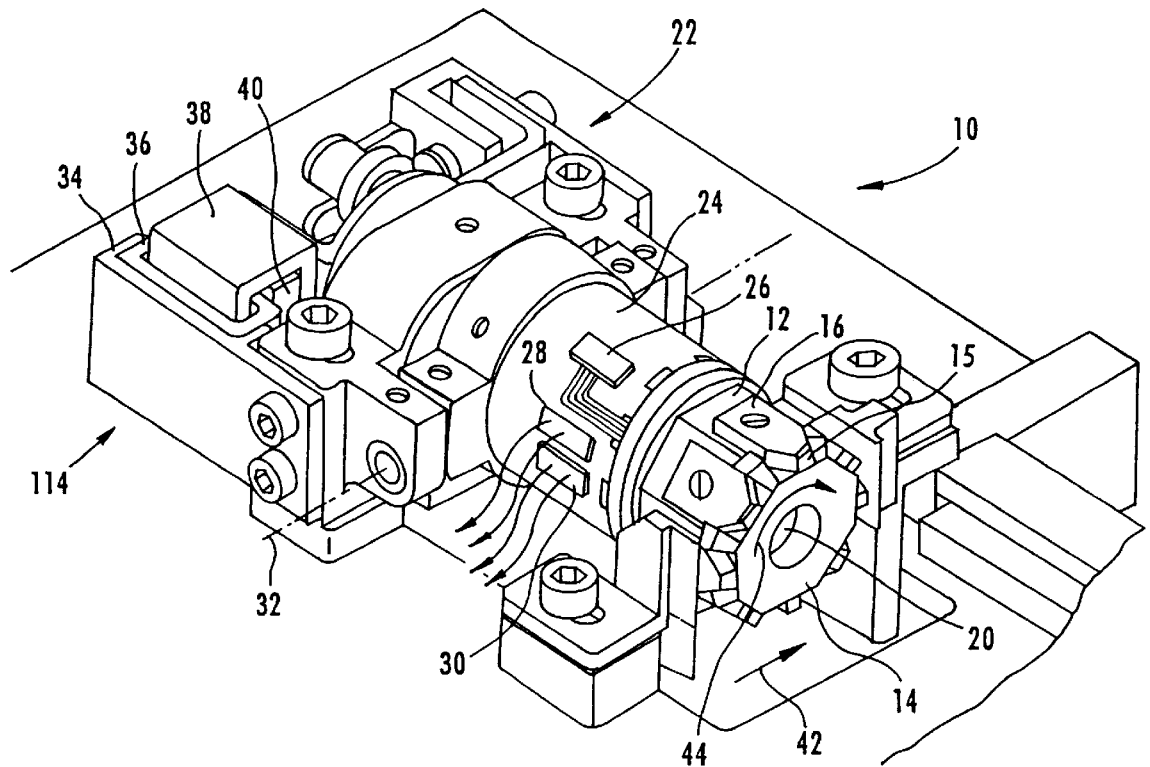
FIG. 1 is a diagram of an arcuate scanner of a tape drive, operating in accordance with an embodiment of the present invention.

FIG. 1 depicts a perspective view of an arcuate scanner head assembly (ASHA) 10 that writes and reads a sequence of arcuate tracks on a recording tape (not shown). In basic construction, ASHA 10 is similar to that described in Lemke et al. For example, ASHA 10 has a drum 12 with an end face 14 on which a plurality of read and write transducers 15 are mounted on support blocks 16. For example, as shown, a transducer 15 is mounted at the forward tip of support block 16. Drum 12 is rotated by a rotatable shaft 20 that is mounted for rotation within a motor/bearing assembly, generally indicated by reference numeral 22. Electrical signals are transferred to and from transducers 15 by a conventional rotary transformer assembly having a rotary piece and a stator piece (not visible in the illustrated view). Drum 12 (with the rotor) is fixed to rotate with shaft 20. A housing 24 and stator are stationary with respect to shaft 20. As shaft 20 rotates together with the rotor and drum 12, electrical signals are written to and read from arcuate tracks (not shown) on the recording tape by a signal path which includes the electromagnetic flux couplings between the rotor and stator. Housing 24 is essentially cylindrical and encloses the structure providing rotational power to shaft 20.

The windings of the stator connect to wiring pads, one of which is shown as reference numeral 26 on the outer surface of housing 24. The wiring pads 26 provide electrical connection through wiring to various circuit elements (not shown).

Sensors 28 and 30 are also mounted to housing 24 and provide, respectively, an index signal and a shaft rotational speed signal for each full rotation of shaft 20.

Two different types of angles that are critical in a read and/or write operation in arcuate scanners are discussed herein. The first type of angle relates to various rotational angles, i.e. of the various transducers 15, about the central axis of the ASHA. These rotational angles are important in establishing and maintaining critical timing of the ASHA. For example, the commutation (e.g., switching) between transducers 15 is typically controlled based on the rotational angle of transducers 15 relative to the index.

The second type of angle is the tilt positioning angle of the ASHA with respect to the tape. AHSA 10 is positioned at a recording location so that planar end face 14 of drum 12 faces the tape on which a sequence of arcuate tracks is to be written or from which a sequence of arcuate tracks is to be read. To accomplish either of these write or read operations, end face 14 is typically adjusted with respect to the edges of the tape by pivoting housing 24, and with it the drum 12, about a pivot axis 32. As illustrated by directional arrows, the tape typically moves past end face 14 in a direction indicated by arrow 42 and drum 12 rotates in the direction of arrow 44.

A tilt motor controls the angular tilting of ASHA 10 with respect to the tape. The tilt motor includes a stationary bracket 34 that carries on its rear portion a conventional voice coil 36 with an open center. A U-shaped bracket 38 is affixed to the rear end of housing 24 by another U-shaped bracket (not illustrated). U-shaped bracket 38 has one leg that is received in the center of the voice coil 36 and another leg to which a permanent magnet 40 is attached. Current through voice coil 36 sets up a magnetic field in its open center that is conducted in U-shaped bracket 36 to permanent magnet 40. As a result, an electromagnetic force is exerted on U-shape bracket 36 and attached magnet 40 having a magnitude determined (in part) by the magnitude of the field induced in the coil 36. ASHA 10 pivots above pivot axis 32 by an angular amount that depends upon the relative strengths of the fields associated with voice coil 36 and permanent magnet 40, thereby selectively positioning the axis of rotation on which shaft 20 and drum 12 rotate.

Alternative embodiments of the present invention provide other tilt mechanisms, such as a servo motor, or oppositely directed magnetic coils, as appreciated by one of ordinary skill in the art. The present invention is not limited to controlling the tilting of the scanner to control the pointing of the scanner at the recording tape. Other embodiments of the invention provide other methods of controlling the pointing position of the scanner head relative to the tape. These include controlling the elevation of the scanner with an elevator mechanism, or providing a side swing mechanism for the scanner, as one of ordinary skill in the art will appreciate.

Figure 2:
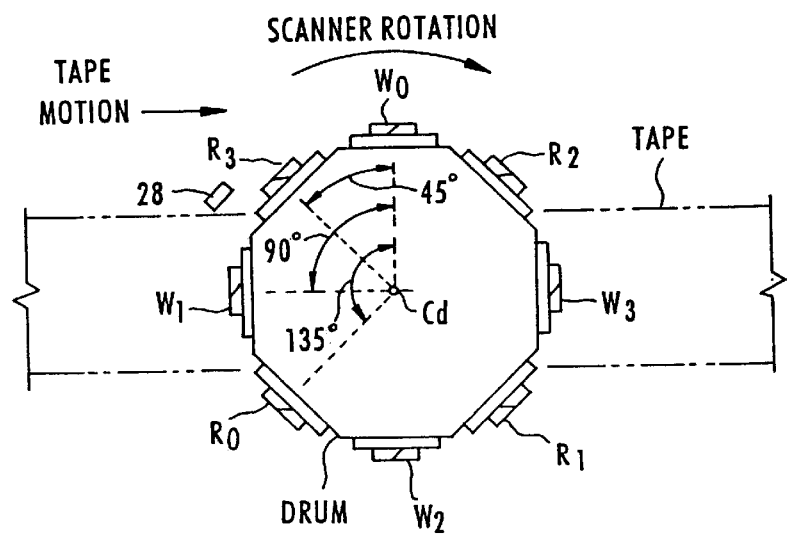
FIG. 2 is front view of the arcuate scanner head assembly, of the scanner of FIG. 1, showing the angular relationship of the read and write heads and the passage of a tape past the head assembly.

FIG. 2 is a view through a tape at the reading location towards the planar end face of the ASHA scanner drum. As shown, there are eight transducers mounted with their active surfaces extending slightly through a plane at the end face of the drum. Four transducers are designated as write transducers and are identified as $W_0$, $W_1$, $W_2$ and $W_3$. In addition, there are four read transducers identified as $R_0$, $R_1$, $R_2$ and $R_3$. Identical subscripts identify write/read transducer pairs in which the track written by transducer $W_1$ is later read by transducer $R_1$. Further, the write transducers are accurately spaced on the drum by 90° in the order in which they write tracks on the tape, which is $W_0$, $W_1$, $W_2$ and $W_3$. Similarly, the read transducers are spaced from each other by 90°, but are spaced from adjacent write transducers by 45°. Further, read transducer $R_1$ is displaced by 135° in the direction opposite the scanner rotation direction from write transducer $W_1$.

The sequence traced across the tape from edge to edge when the scanner rotates in the direction indicated in FIG. 2 is: $W_0$, $R_3$, $W_1$, $R_0$, $W_2$, $R_1$, $W_3$, $R_2$. Write heads $W_0$ and $W_2$ are oriented to write at a first azimuth angle on the tape, and read heads $R_0$ and $R_2$ read information recorded at the first azimuth angle. Write heads $W_1$ and $W_3$ are oriented to write at a second azimuth angle on the tape, and read heads $R_1$ and $R_3$ read information recorded at the second azimuth angle. As thus described, when the tape speed is matched to an appropriate rotational velocity of drum 12, the write transducers, when energized, will trace a sequence of contiguous recorded arcuate tracks with alternating azimuthal orientation. Similarly, the read heads sense recorded information from a sequence of arcuate tracks with alternating azimuthal orientation.

Figure 3:
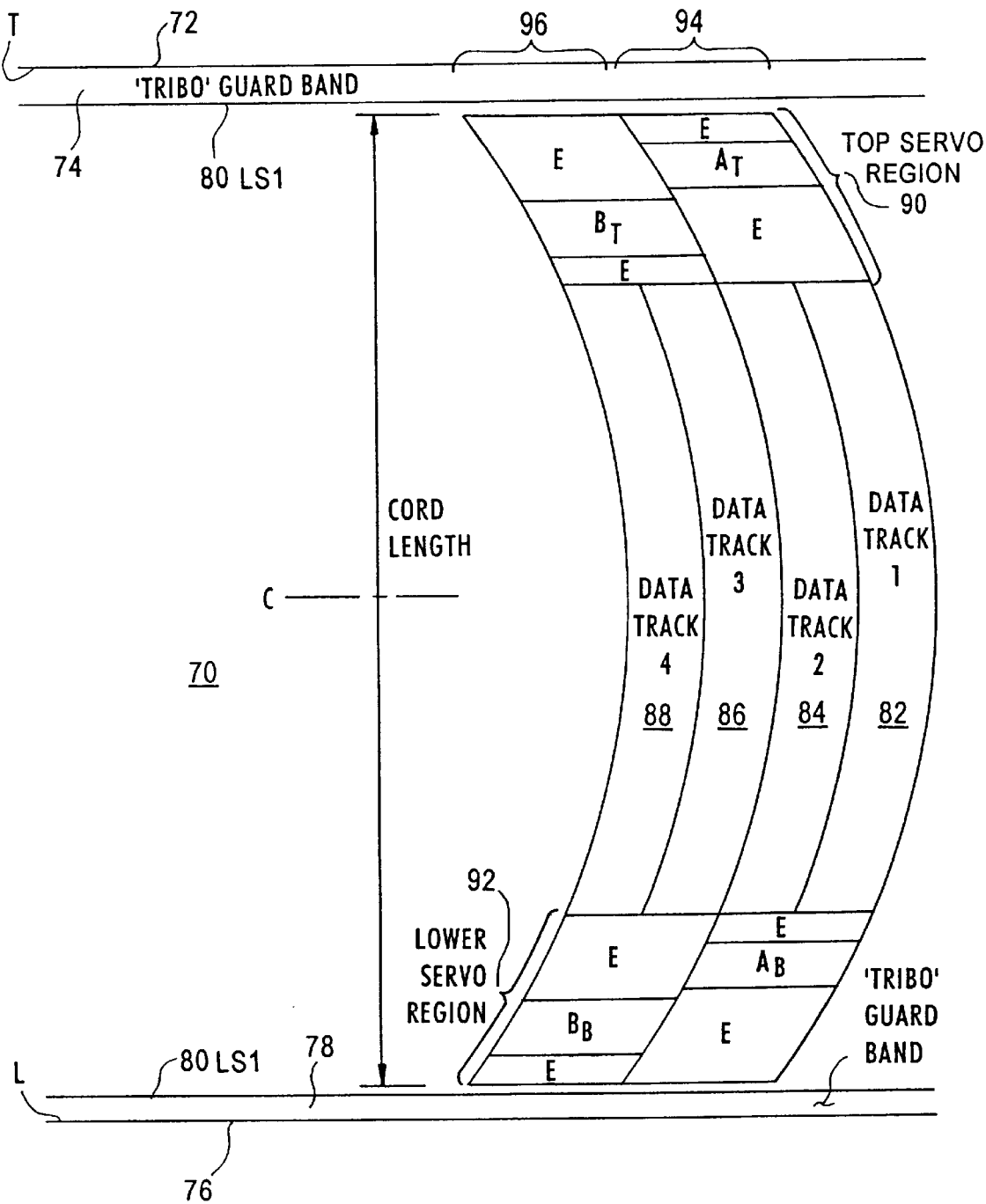
FIG. 3 is a diagram of the format of information recorded on the tape, when viewed through the tape toward the planar surface end of the arcuate scanner head assembly in FIG. 2.

FIG. 3 shows the preferred format of the information on the developed tape in somewhat simplified form, as viewed through a tape 70 looking towards end face 14 of drum 12, in FIG. 2. It should also be noted that the various regions on tape 70 are not drawn to scale.

As shown in FIG. 3, the "TRIBO" interface standard specifies a region along the top edge 72 of the tape as a top guard band 74. Similarly, a lower guard band 76 extends along a lower edge 76 of tape 70. Top guard band 74 is typically 15 mils wide and lower guard band 78 is typically 10 mils wide. Each of the guard bands (74 and 78) extend for the full length of tape 70. An arcuate scanner type data recording system will not write data in guard bands 74 and 78.

Along the inner edge of each of guard bands 74 and 78 are magnetic stripes, each of which is designated as an LS1 stripe 80. The tape manufacturer deeply records each LS1 stripe 80 along the entire length of tape 70. An arcuate scanner type data recording system, in accordance with an embodiment of the present invention identifies and utilizes at least one LS1 stripe 80 as a reference point during read and write operations. As such, the additional LS1 stripe 80 is not strictly necessary for most arcuate scanner type data recording systems, including that in the present invention. Unless otherwise specified, when LS1 stripe 80 is referred to hereinafter it is the lower LS1 stripe 80 (which is closest to lower guard band 78) that is being referenced. Nonetheless, it is recognized that the present invention can be adapted to use the other LS1 stripe 80 or both LS1 stripes.

The recorded sections of tape 70 are spaced from the upper and lower guard bands 74 and 78, and LS1 stripes 80 by a specified distance, e.g. 1.0 mils. The actual data tracks (e.g., data tracks 82, 84, 86, 88) are each further bounded by a top servo region 90 and a lower servo region 92. Provided within each of these servo regions of a single track is a "T burst" and a "B burst" of servo frequency signals. Unlike LS1 stripe 80, both of the T and B bursts are recorded onto tape 70 by the ASHA 10 during a write operation.

Thus, for example, in servo track A 94 there is shown, at the beginning (i.e., top) of a servo track A, a predetermined amount of erase signal (E) followed by a T burst ($A_T$) of servo frequency signal, and then additional erase signal (E). Likewise, at the end (i.e., bottom) of a servo track A 94 there is also a predetermined amount of erase signal (E) followed by a B burst ($A_B$) of servo frequency signal, and an additional erase signal (E). Similarly, in a subsequent servo track B 96 there is a predetermined amount of erase signal (E) followed by a T burst ($B_T$) of servo frequency signal, and then additional erase signal (E). At the end (i.e., bottom) of a servo track B 96 there is also a predetermined amount of erase signal (E) followed by a B burst ($B_B$) of servo frequency signal which is followed by an additional erase signal (E).

During a read operation, a predetermined transducer 15 (e.g., a read head) partially overlaps adjacent servo tracks in such a manner that it detects the T and B servo bursts from adjacent tracks during a single rotation (i.e., scan). By way of example, when ASHA 10 is properly aligned with tape 70, transducer 15 detects differing predetermined amounts of each of the T bursts from adjacent servo tracks during a first period of time (i.e., a time window) while scanning from the top 72 of tape 70. Likewise, when nearing the end of the scan (near the bottom 76 of tape 70), transducer 15 detects differing predetermined amounts of each of the B bursts from adjacent servo tracks during a later period of time. As discussed below, the magnitudes of the signals detected while scanning over the top and bottom servo regions 90 and 92, respectively, are used to establish and maintain proper alignment of ASHA 10 with respect to tape 70.

The present invention is directed towards methods and apparatus that allow ASHA 10 to be coarsely positioned such that additional fine adjustments, that are based on the detection of the top and bottom servo regions 90 and 92, respectively, can be more effectively used. Thus, before discussing various methods and apparatus of the present invention, the problems associated with a significantly misaligned AHSA 10 will be discussed.

Figure 4:
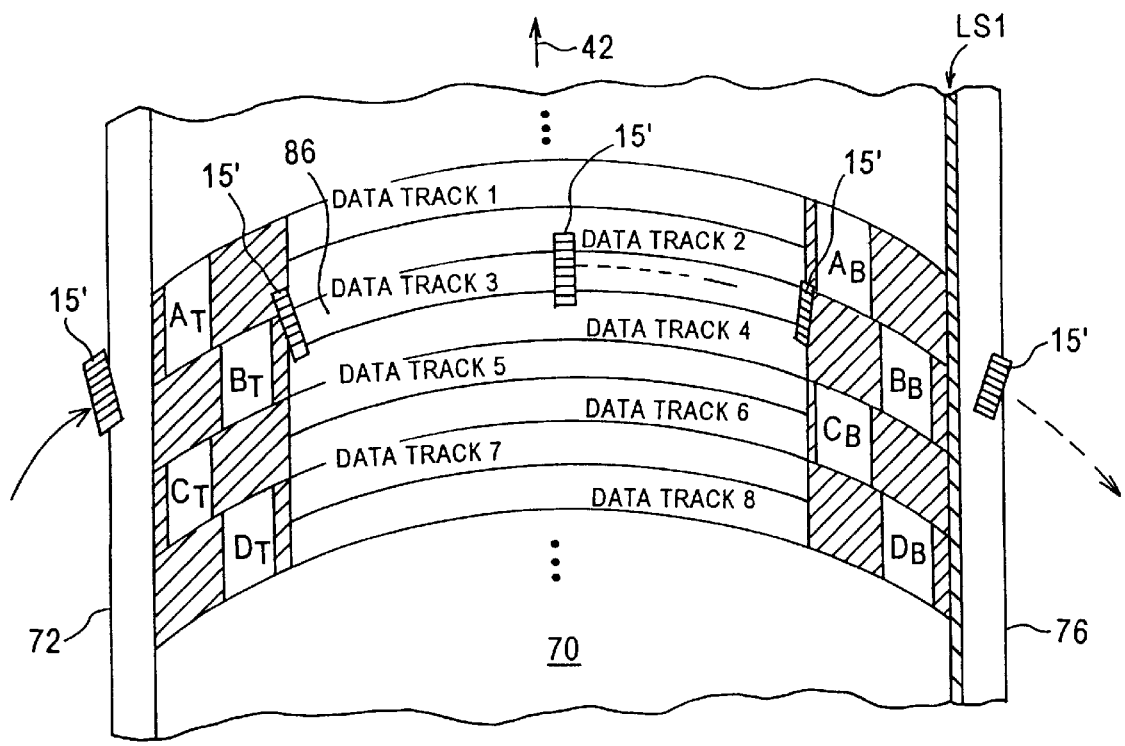
FIG. 4 is a diagram of a read head crossing over a recording tape, as in FIG. 3, wherein the read head is significantly aligned with regard to the recorded tracks on the tape.

FIG. 4 is a simplified illustration, similar to FIG. 3, depicting a significantly aligned transducer 15' and the approximate path which it follows across the arcuate tracks on tape 70 during a read operation. As shown, tape 70 is moving in the direction shown by arrow 42. First, transducer 15' scans over predetermined portions of T burst $A_T$ and T burst $B_T$ (e.g., 70% over $A_T$, and 30% over $B_T$) near the top 72 of tape 70. Next, transducer 15' scans data track 3 (reference 86) and the information recorded thereon is retrieved. Then the path of transducer 15' continues towards the bottom 76 of tape 70 wherein transducer 15' scans over predetermined portions of B burst $A_B$ and B burst $B_B$ (e.g., 30% over $A_B$, and 70% over $B_B$).

Thus, when transducer 15' is significantly aligned as shown in FIG. 4, the detected signals from the A and B bursts are indicative of the alignment of ASHA 10 to the tracks recorded on tape 70. These detected servo region signals are used within a servoing system to monitor and maintain proper alignment. For example, a fine tilt adjustment circuit, which is discussed below and shown in FIG. 7, monitors the relative magnitude of the detected servo region signal at specific times to determine if the measured T and B bursts are equal to predetermined magnitudes for the T and B bursts. If unequal (i.e., out of tolerance) then the servoing system further corrects and/or fine-tunes the alignment by making minor positional changes (e.g., changes in the tilt) of ASHA 10 with respect to the tracks recorded on tape 70.

Figure 5:
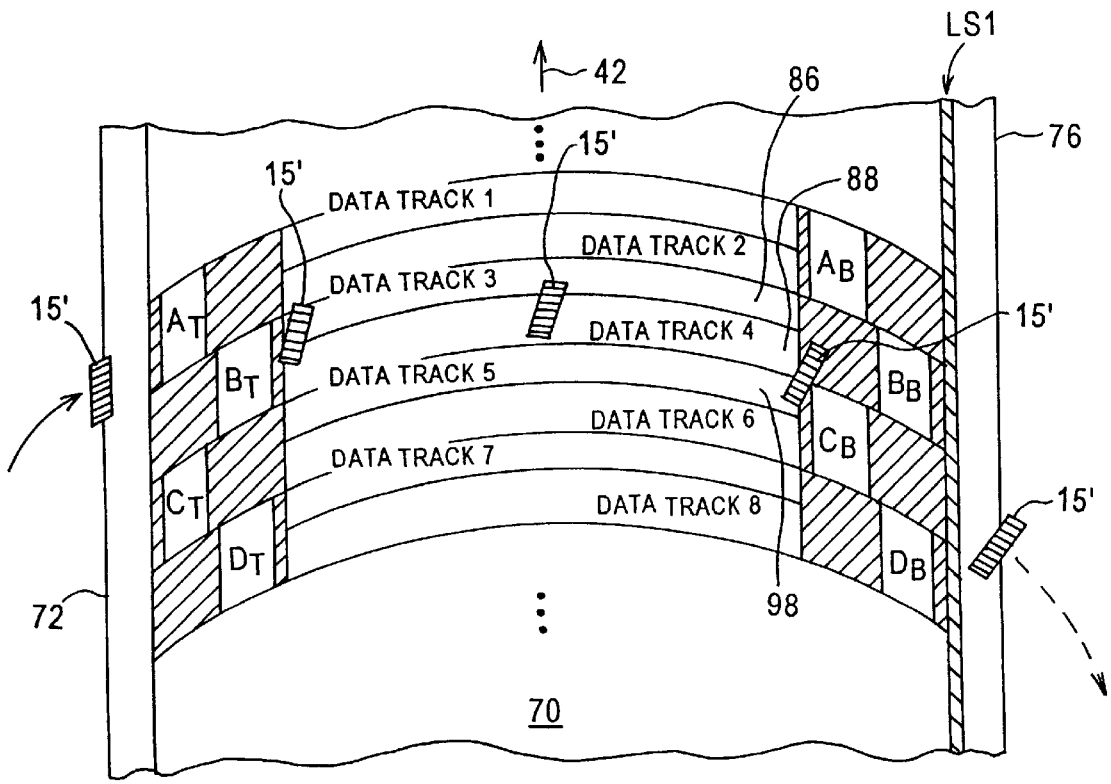
FIG. 5 is a diagram of a read head crossing over a recording tape, as in FIG. 3, wherein the read head is significantly misaligned with regard to the recorded tracks on the tape.

However, as depicted in FIG. 5, when ASHA 10 is significantly misaligned with the tracks recorded on tape 70 then the path of the transducer 15' passes over several tracks. For example, transducer 15' scans over portions of T burst $A_T$ and T burst $B_T$ near the top 72 of tape 70. Next, transducer 15' scans portions of data track 3 (reference 86), data track 4 (reference 88) and data track 5 (reference 98). Then the path of transducer 15' continues towards the bottom 76 of tape 70 wherein transducer 15' scans over portions of B burst $B_B$ and B burst $C_B$.

Thus, it is possible in some circumstances, to have transducer 15' pick up signals from different top and bottom servo regions (i.e., the servo regions from non-adjacent servo tracks). For example, in FIG. 5, transducer 15' initially reads the T bursts in the servo regions for tracks A and B, and due to the misalignment of ASHA 10 ends up reading the B bursts for in the servo regions for tracks B and C. As a result, a servoing system having only a fine tilt adjustment circuit that relies on the detected servo region signals will align (or attempt to align) ASHA 10 with reference to the servo regions from non-adjacent servo tracks. When this occurs, ASHA 10 remains significantly misaligned and the information retrieved from the multiple data tracks is incomplete and essentially a mix of useless data. Moreover, the servoing system can be tricked into determining that the alignment is correct.

Figure 6A:
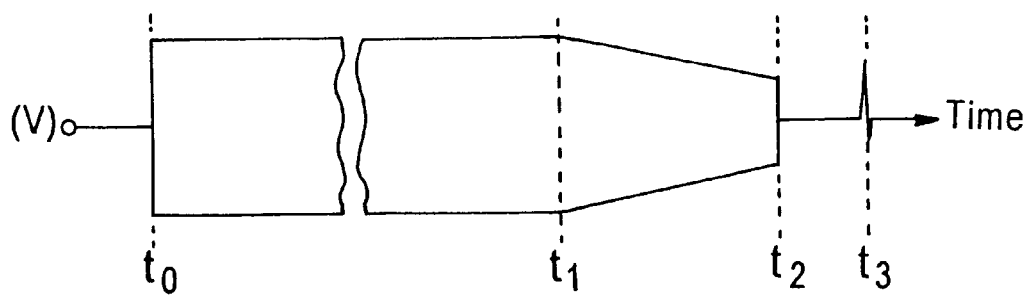
FIGS. 6a through 6c are graphs depicting the resulting envelopes for signals from read heads that are significantly aligned to a signal data track, as in FIG. 4.
Figure 6B:
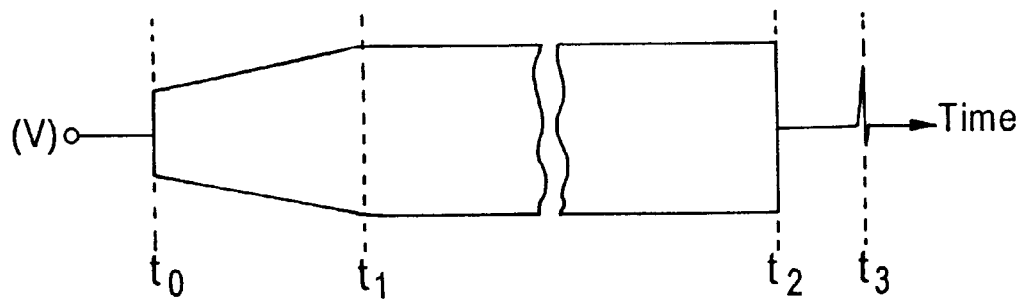

With this in mind, FIGS. 6a–6d depict a portion of a resulting envelope for a scan beginning before the top servo region and ending shortly after the LS1 stripe. More specifically, FIGS. 6a and 6b depict an envelope, as detected by transducer 15' of FIG. 4, resulting from a minor misalignment of ASHA 10 to the recorded tracks on tape 70.

As depicted in FIG. 6a, the envelope is fairly even as transducer 15' scans across the top servo region 90 and data track 3 beginning at time $t_0$ until approximately time $t_1$. From time $t_1$ to time $t_2$ transducer 15' is drifting off of data track 3 and lower servo region 92 as reflected in the steady decrease in the magnitude of the envelope. At time $t_2$ transducer 15' has completed the scan of the recorded information. Next, at time $t_3$ transducer 15' scans over the lower LS1 stripe 80 as depicted by the spike in the envelope.

Similarly, in FIG. 6b, transducer 15' begins slightly off of top servo region 90 and data track 3 beginning at time $t_0$ and becomes more centered over data track 3 and eventually over lower servo region 92 during the period from approximately time $t_1$ through time $t_2$. At time $t_2$ the recorded information ends. At time $t_3$ the lower LS1 stripe 80 is detected.

Figure 6C:
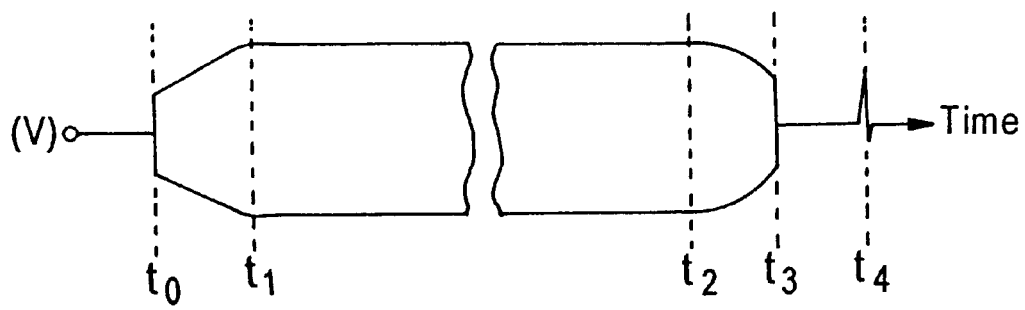

The minor misalignments of ASHA 10, as depicted in the envelopes in FIGS. 6a and 6b are correctable via a servoing system having only a fine tilt adjustment circuit that relies on the detected servo region signals. In either situation (i.e., FIG. 6a or 6b), a fine tilt adjustment circuit that compares the magnitude of the servo signals from top servo region 90 to those from bottom servo region 92 can detect the minor misalignment and output a correction or error signal to adjust the position of AHSA 10. Thus, for example, the tilting of ASHA 10 can be adjusted via the servoing system. The resulting envelope in FIG. 6c depicts the corrected and preferred envelope for a properly aligned transducer 15' scanning top servo region 90, data track 3, lower servo region 92, and lower LS1 stripe 80. As shown, the envelope is relatively flat from approximately time $t_1$ to time $t_2$. Thus, transducer 15' is approximately centered over the data track 3 during the scan and ASHA 10 is said to be properly aligned with the recorded track on tape 70.

Figure 6D:
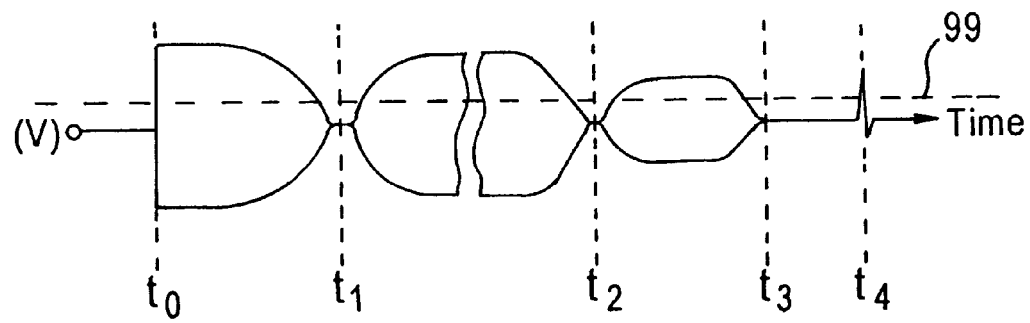
FIG. 6d is a graph depicting the resulting envelope for a signal from a read head that is significantly misaligned and passing over a plurality of data tracks, as in FIG. 5.

However, the envelope is very different when several tracks are being crossed due to a significant misalignment of ASHA 10 and recorded tracks on tape 70. For example, a resulting envelope is depicted in FIG. 6d for transducer 15' (in FIG. 5) as it scans over several recorded tracks. As shown in FIG. 6d, the envelope has several fluctuations (i.e., at times $t_1$, $t_2$ and $t_3$) due to the crossing over from one data track to the next and the subsequent reading for a short period of time of the data recorded on each these tracks. Despite these fluctuations, a fine tilt adjustment circuit that only compares the magnitude of the servo signals from the top and lower servo burst regions can be tricked into determining that the alignment is proper when in fact it is significantly misaligned. For example, if the detected servo signals are equal in magnitude then the servoing system detects a proper alignment without determining if the proper servo regions where scanned. Obviously, the data scanned from portions of different data tracks is not desirable.

The present invention addresses this problem by providing a coarse alignment to ASHA 10 when these fluctuations in the envelope are detected. Once the coarse alignment has been made and the fluctuations eliminated, then a fine tilt adjustment based, for example, on the detected servo signals is made to bring ASHA 10 into proper alignment.

Referring back to FIG. 6d, for example, there is a threshold voltage level 99 which is superimposed across the resulting envelope for the significantly misaligned transducer 15". Threshold voltage level 99 is selected and used to detect fluctuations in the envelope and determine if a coarse alignment of ASHA 10 is required. Thus, for example, if the envelope that is detected passes below the threshold value this indicates that the alignment may be significantly off and that more than one track is being scanned.

As depicted in FIG. 6d, threshold voltage level 99 is breached at least twice, first at time $t_1$ and again at time $t_2$.

In this case, a coarse adjustment in the position of ASHA 10 either increases the misalignment or increases the alignment. By counting the number of fluctuations in a scan (e.g., as detected by the envelope breaching threshold voltage level 99) the correct positioning of ASHA 10 is determinable. For example, if there are two crossings and a coarse adjustment results in an increase in the number of crossings (e.g., three crossings) then the coarse adjustment was in the wrong direction(s) and ASHA 10 is even more misaligned. However, if the coarse adjustment results in a decrease in the number of crossings then the coarse adjustment was in the correct direction(s). Again, the goal is to make coarse adjustments until the number of crossings is zero. As such, several coarse adjustments may be required to reach this goal.

Figure 7:
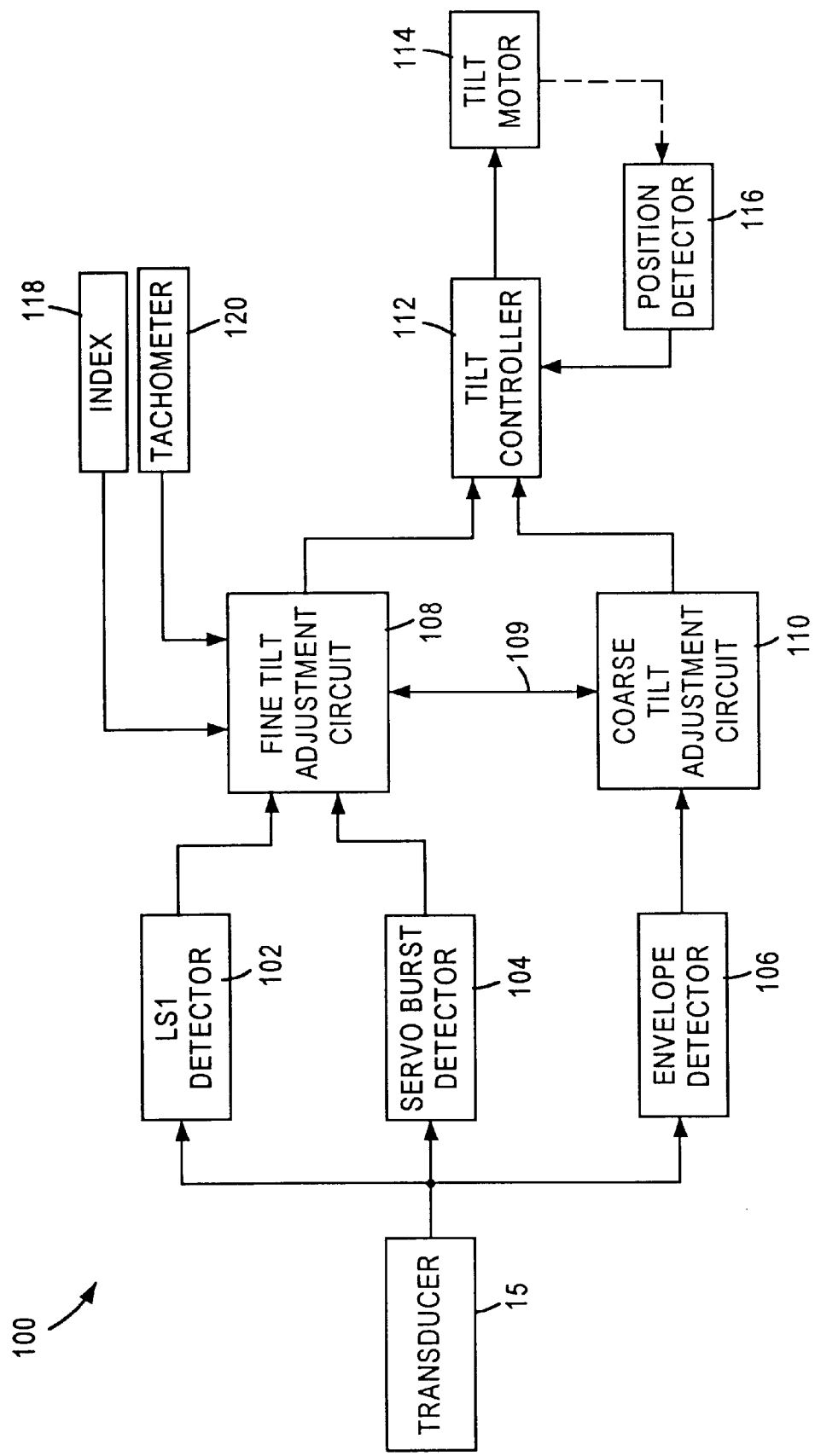
FIG. 7 is a block diagram depicting a servoing system having a coarse tilt adjustment circuit for use in controlling the position of an ASHA, in accordance with an embodiment of the present invention.

FIG. 7 is a block diagram depicting a servoing system 100 for use in positioning ASHA 10 in accordance with an exemplary embodiment of the present invention. Servoing system 100 is used to adjust the tilt of ASHA 10 with respect to tape 70. Servoing system 100 includes a LS1 detector 102, a servo burst detector 104 and an envelope detector 106, each of which are coupled to receive a scanned signal from at least one transducer 15 in ASHA 10. Servoing system 100 further includes a fine tilt adjustment circuit 108, a coarse tilt adjustment circuit 110, a tilt controller 112, and a position detector 116.

As depicted, LS1 detector 102 receives the scanned signal and in response outputs a signal identifying when transducer 15 scans an LS1 stripe 80. Servo burst detector 104 receives the scanned signal and in response outputs one or more signals identifying the servo signals scanned in top servo region 90 and lower servo region 92. The outputs from LS1 detector 102 and servo burst detector 104 are provided to fine tilt adjustment circuit 108. The output from LS1 detector 102 is used, along with an index signal from index 118 and a tachometer signal from tachometer 120, within fine tilt adjustment circuit 108 to determine the rotational location of ASHA 10 and establish timing signals associated with the various transducers 15 within ASHA 10. The output(s) from servo burst detector 104 are used within fine tilt adjustment circuit 108 to identify minor misalignments, or the proper alignment, of ASHA 10 to the recorded tracks of tape 70 during a read operation.

The output from fine tilt adjustment circuit 108, which is a fine error signal, is provided to tilt controller 112. Tilt controller 112 uses the fine error signal, along with a sensed position signal from position detector 116, to output a tilt control signal to tilt motor 114. The tilt control signal causes tilt motor 114 to adjust the tilt position of ASHA 10. Tilt motor 114, for example, includes the elements 34, 36, 38 and 40 of FIG. 1.

Position detector 116 identifies the current tilt angle of ASHA 10 and outputs the sensed position signal to tilt controller 112. For example, in one embodiment position detector 116 can be an optical position detector arranged to detect the position of ASHA 10.

Envelope detector 106, in accordance with an embodiment of the present invention, receives the scanned signal and in response provides a signal corresponding to the envelope of the scanned signal to coarse tilt adjustment circuit 110. For example, in one embodiment envelope detector 106 includes a rectifier and low pass filter.

Coarse tilt adjustment circuit 110 compares the envelope of the scanned signal to a threshold voltage level to determine if ASHA 10 is significantly misaligned. In one embodiment, for example, coarse tilt adjustment circuit 110 identifies the number of crossings of transducer 15 from one track to the next by counting the number of times the envelope breaches the threshold voltage level. If coarse tilt adjustment circuit 110 identifies that ASHA 10 is significantly misaligned then a disabling signal is provided to fine tilt adjustment circuit 108, which temporarily disables fine tilt adjustments form occurring. At or about the same time, coarse tilt adjustment circuit 110 also outputs a coarse error signal to tilt controller 112 which causes tilt controller 112 to make a coarse adjustment in the tilt angle of ASHA 10 via tilt motor 114. When the coarse adjustment to ASHA 10 has been completed, then the disabling signal is no longer output and fine tilt adjustment circuit 108 is once again enabled.

Figure 8:
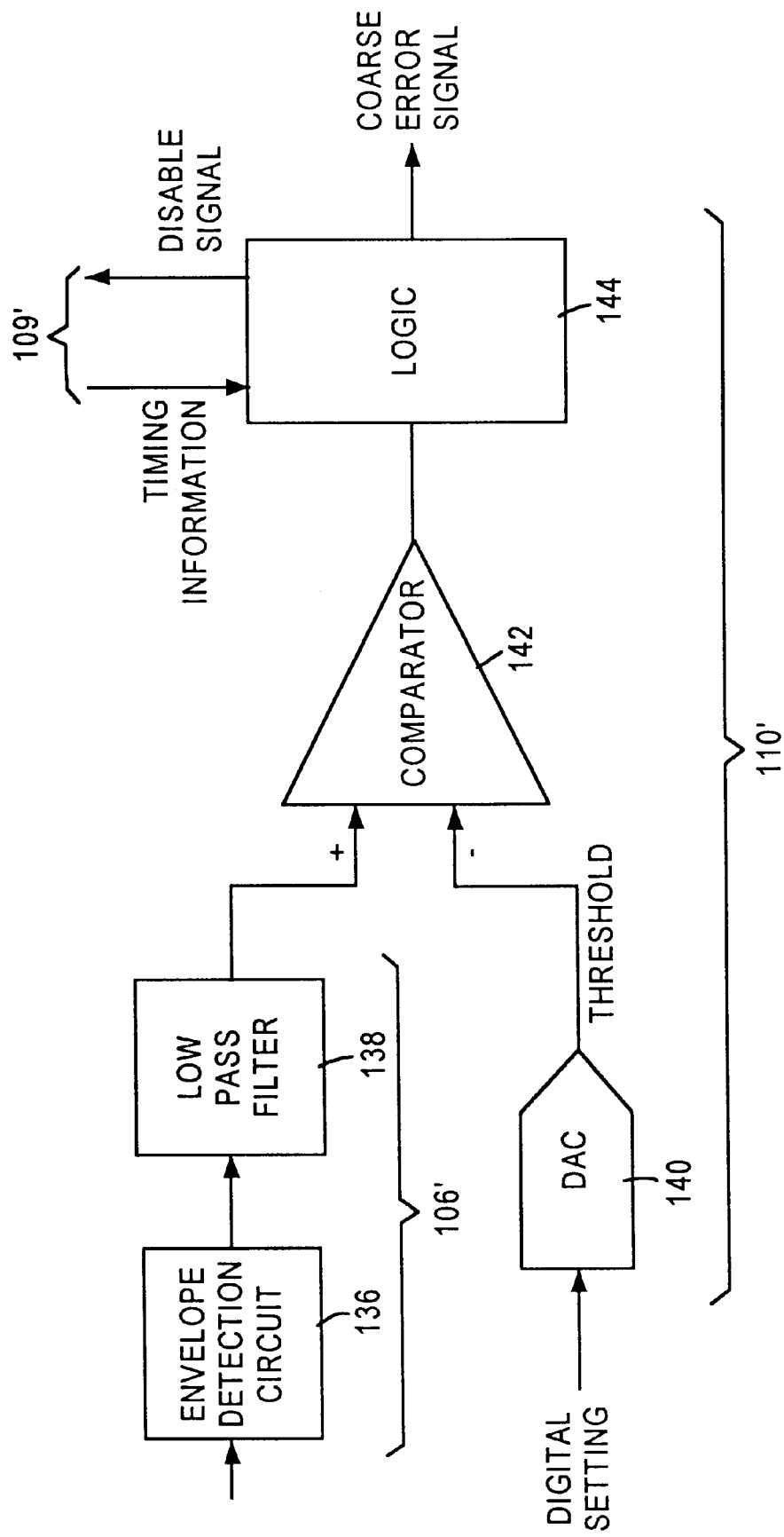
FIG. 8 is a block diagram schematically depicting a coarse tilt adjustment circuit as in FIG. 7, in accordance with one embodiment of the present invention.

FIG. 8 is a block diagram illustrating an envelope detector 106' and coarse tilt adjustment circuit 110' in accordance with one embodiment of the present invention. Envelope detector 106' includes an envelope detection circuit 136 and a low pass filter 138. Envelope detection circuit 136 detects the envelope and rectifies it. Low pass filter 138 smoothes and conditions the envelope. Coarse tilt adjustment circuit 110 includes a digital to analog converter (DAC) 140, a comparator 142 and logic 144. DAC 140 is used to convert a digital setting received from a microprocessor (not shown) to an analog threshold voltage level signal which is provided to a negative input terminal of comparator 142. Comparator 142 also receives the output from low pass filter 138 via a positive input terminal. Comparator 142 compares the signals on the negative and positive input terminals and outputs a signal that pulses when the voltage of the envelope is less than the threshold voltage level signal. The output from comparator 142 is provided to logic 144.

Logic 144 counts the number of pulses in the signal received from comparator 142 during specific time windows so as to identify if ASHA 10 is significantly misaligned with the recorded tracks on tape 70. For example, timing information is received via one or more of connectors 109' from fine tilt adjustment circuit 108. The timing information, which is based at least in part on the rotational information from index 118 and tachometer 120, identifies when transducer 15 is scanning the recorded tracks on tape 70. If, during a specific time window, logic 144 counts at least one pulse then a disable signal will be provided to fine tilt adjustment circuit 108, via connectors 109', and a coarse error signal will be output to tilt controller 112. When the disable signal is asserted, fine tilt adjustment circuit 108 will not output a fine error signal.

Figure 9:
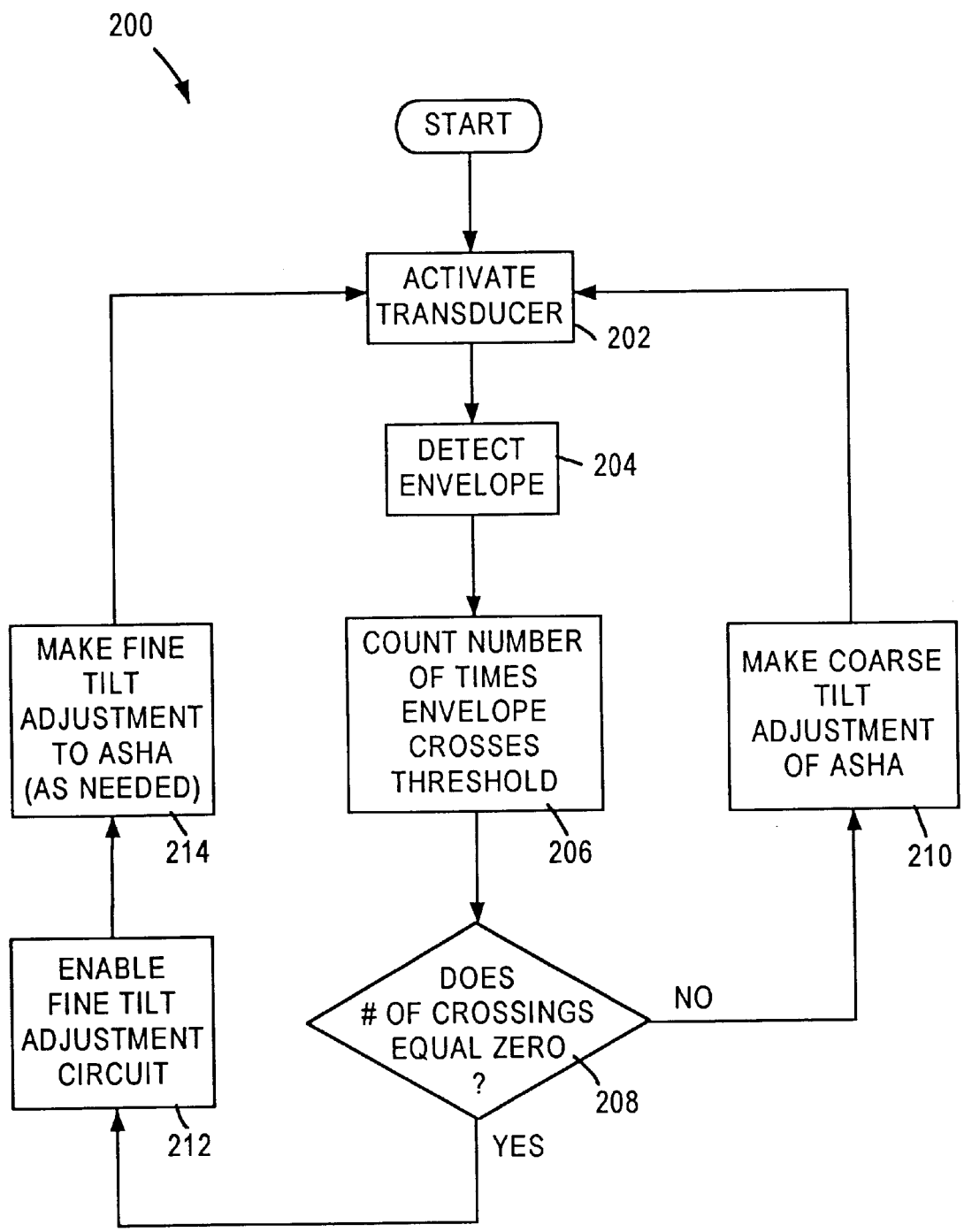
FIG. 9 is a flow-chart depicting a method for adjusting the tilt angle of an ASHA that is scanning a tape during a read operation, in accordance with one embodiment of the present invention.

FIG. 9 is a block diagram illustrating a method 200 for adjusting the tilt angle of an ASHA 10 that is scanning a tape 70 during a read operation, in accordance with an exemplary embodiment of the present invention.

Method 200 includes activating a transducer (e.g., one of the plurality of transducers 15 in FIG. 1) in step 202. The activation of the transducer is, for example, controlled via a timing or commutation circuit that is responsive to the rotational position of ASHA 10 based on an sensed position or index and/or a measurement from a tachometer arrangement. The timing or commutation circuit can include microcode for use in a logic and/or microprocessor circuit. In step 204, an envelope for the scanned signal from the activated transducer is detected. Detection includes, for example, envelope detection, rectification and further filtering and/or conditioning of the scanned signal.

Next, in step 206, the envelope is compared to a threshold voltage level and a count is kept of the number of times, during a specific timing window, that the threshold voltage level is breached (e.g., crossed-over) by the envelope. In step 208, if the count is zero (i.e., count=0) then method 200 continues with step 212; if the count is not zero (i.e., count>0) then method 200 continues with step 210. If the count is zero, then in step 212, the fine tilt adjustment circuit is enabled. In step 214 a fine tilt adjustment is made to the position of ASHA 10 (if required), for example, via a tilt motor. Following step 214 method 200 returns to step 202. If the count is not zero, then in step 210, a coarse tilt adjustment is made to ASHA 10, for example, via the tilt motor. Following step 210 method 200 returns to step 202.

Although this description has been directed more towards methods and apparatus for identifying when ASHA 10 is significantly misaligned with the recorded tracks of tape 70, it is understood that the present invention is an improvement over existing servoing techniques and systems. As such the methods and apparatus are fully adaptable for use in other servoing systems which are simpler or more complex in their design. By way of example, additional embodiments of the present invention include timing and orientation functions for servo control, data read commutation, and data write sampling. These functions are based on detection of the lower LS1 stripe 80 and other measurable/detectable positional relationships between ASHA 10 and tape 70 and/or the tracks recorded on tape 70. As such, co-pending U.S. patent application Ser. No. 08/891,094 filed on Jun. 9, 1997, entitled FLAT SERVO BURSTS FOR ARCUATE TRACK SCANNER (Attorney Docket No. 2674-018) is incorporated herein by reference in its entirety. This co-pending application discloses the use of servo burst regions in aligning the arcuate scanner head assembly to the tape. Likewise, co-pending U.S. patent application Ser. No. 557,772 filed on Nov. 18, 1995, entitled METHOD AND ARRANGEMENT FOR SERVOING AND FORMATTING MAGNETIC RECORDING TAPE now U.S. Pat. No. 5,796,537 is also incorporated herein by reference in its entirety. This co-pending application discloses timing and commutation techniques based on the detection of the lower LS1 stripe.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for correcting the alignment of an arcuate scanner head assembly to arcuate tracks on a tape, the method comprising:
   causing a transducer located on a rotating drum of the arcuate scanner head assembly to sense changes in magnetic flux recorded in at least one of the arcuate tracks on the tape during a pass of the transducer across the tape and output a corresponding signal;
   detecting an envelope of the signal associated with the at least one arcuate track during the pass of the transducer across the tape;
   comparing said envelope to a threshold value; and
   causing a position of the arcuate scanner head assembly to change if the envelope breaches the threshold value during the pass of the transducer across the tape.

2. The method as recited in claim 1, wherein the comparing comprises comparing a voltage of the envelope to a threshold voltage, and the threshold value is breached by the envelope each time a magnitude of the voltage of the envelope is less than a magnitude of the threshold voltage.

3. The method as recited in claim 2, wherein causing a position of the arcuate scanner head assembly to change comprises moving the arcuate scanner head assembly when the envelope voltage breaches the threshold voltage during a specific period of time.

4. The method as recited in claim 3, wherein causing a position of the arcuate scanner head assembly to change further comprises counting a number of times that the envelope voltage breaches the threshold voltage during a specific period of time.

5. The method as recited in claim 4 wherein moving the arcuate scanner head assembly further includes moving the arcuate scanner incrementally in a direction such that the counted number of breaches in a subsequent period of time is zero.

6. The method as recited in claim 5 wherein the position is an angular tilt position, and moving the arcuate scanner head assembly includes changing the angular tilt position.

7. An apparatus in a servoing system for aligning a transducer on an arcuate scanner head assembly to data tracks recorded on a tape, the apparatus comprising:
   an envelope detector coupled to the transducer and configured to detect an envelope of a scanned signal received from the transducer during an arcuate scan of at least one of the data tracks on the tape; and
   a coarse adjustment circuit coupled to the envelope detector and configured to output an error signal that identifies a misalignment of the transducer to the data tracks recorded on the tape when the envelope breaches a threshold value during the arcuate scan.

8. The apparatus as recited in claim 7 wherein the envelope detector includes an envelope detection circuit coupled to the transducer and configured to receive the scanned signal, rectify the signal and detect the envelope of the signal.

9. The apparatus as recited in claim 8 wherein the envelope detector includes a filter circuit coupled to the envelope detection circuit and configured to filter the output of the envelope detection circuit and output the envelope as a signal.

10. The apparatus as recited in claim 7 wherein the coarse adjustment circuit includes a comparator that is coupled to the envelope detector and configured to compare a voltage of the envelope with a threshold voltage and identify when the a magnitude of the voltage of the envelope is less than a magnitude of the threshold voltage.

11. The apparatus as recited in claim 10 wherein the coarse adjustment circuit includes logic coupled to the comparator and configured to count a number of times that the comparator identifies that the envelope has breached the threshold voltage during a scan and generates the error signal when the count is greater than zero.

12. A servoing system for use in an arcuate scanner having an arcuate scanner head assembly that includes at least one transducer on a rotatable drum, the transducer being suitable for reading an arcuate shaped track recorded on a tape, the servoing system comprising:
   a first detection circuit coupled to the transducer and configured to detect a first alignment identifier and a second alignment identifier within a scanned signal from the transducer during a scan of the transducer over an arcuate shaped portion of the tape containing the track, wherein each of the alignment identifiers are recorded on the tape;
   a second detection circuit coupled to the transducer and configured to detect an envelope of the scanned signal during the scan over the arcuate shaped portion of the tape;
   logic coupled to the first and second detection circuits, the logic being configured to compare the first and second alignment identifiers as detected during the scan and output a fine error signal based thereon, and compare the envelope as detected during the scan over the arcuate shaped portion of the tape to a threshold value and output a coarse error signal based thereon, and wherein the fine error signal identifies a minor misalignment of the transducer to the tape, and the coarse error signal identifies a significant misalignment of the transducer to the tape; and positioning means coupled to the logic and the arcuate scanner head assembly, the positioning means being responsive to at least one of the fine error and course error signals and configured to change a position of the arcuate scanner head assembly with respect to the tape based thereon.

13. The servoing system as recited in claim 12 wherein the logic outputs the coarse error signal when the envelope is less than the threshold value, and wherein the logic outputs the coarse error signal to the exclusion of the fine error signal, and the fine error signal to the exclusion of the coarse error signal.

14. The servoing system as recited in claim 13 wherein the logic counts a number of times that the envelope is less than the threshold value during the scan and continues to output the coarse error signal until a count for a subsequent scan is equal to zero, and wherein the positioning means in response to the coarse error signal moves the arcuate scanner head assembly incrementally in a direction such that the count for the subsequent scan is lower than the count from the scan.

15. The servoing system as recited in claim 12 wherein the position is an angular tilt position.

16. The servoing system as recited in claim 15 wherein the positioning means includes:

a tilt motor mechanically coupled to control the angular tilt position of the arcuate scanner head assembly in response to a tilt control signal;

a position detector configured to detect the angular tilt position of the arcuate scanner head assembly and output a corresponding position signal; and a tilt controller coupled to the logic, the tilt motor and the position detector, the tilt controller being configured to receive the fine and coarse error signals and the position signal output and to provide the tilt control signal to the tilt motor, wherein the tilt control signal is based on a comparison of the position signal to at least one of the fine and coarse error signals.

17. The servoing system as recited in claim 16 wherein the logic includes:

a fine tilt adjustment circuit coupled to the first detection circuit and configured to output the fine error signal based on the first and second alignment identifiers and a calculated rotational position of the arcuate scanner head assembly; and a coarse tilt adjustment circuit coupled to the second detection circuit and configured to output the coarse error signal.

18. The servoing system as recited in claim 17 wherein the second detection circuit includes:

an envelope detector circuit coupled to the transducer and configured to receive the scanned signal, rectify the signal and detect the envelope of the signal; and a low pass filter coupled to the envelope detector and configured to filter the output of the envelope detector circuit and provide the envelope to the coarse tilt adjustment circuit.

19. The servoing system as recited in claim 12 wherein the first and second alignment identifiers are servo signals resulting from the transducer scanning a plurality of servo bursts recorded on the tape.

20. The servoing system as recited in claim 12 wherein at least one of the first and second alignment identifiers is an indexing signal resulting from the transducer scanning one or more indexing stripes recorded on the tape.

21. An apparatus for controlling alignment of a scan head assembly to data tracks recorded to a tape, comprising:

means for generating a position error signal based on an envelope of a transducer output detected as the scan head assembly passes the transducer across an area of the tape containing one or more of the tracks; and a mechanism for positioning the assembly based on the position error signal.

* * * * *